(12) United States Patent
Hwang

(10) Patent No.: US 8,903,871 B2
(45) Date of Patent: Dec. 2, 2014

(54) DYNAMIC MANAGEMENT OF LOG PERSISTENCE

(71) Applicant: Facebook, Inc., Menlo Park, CA (US)

(72) Inventor: Eric Hwang, San Jose, CA (US)

(73) Assignee: Facebook, Inc., Menlo Park, CA (US)

(*) Notice: Subject to any disclaimer, the term of this patent is extended or adjusted under 35 U.S.C. 154(b) by 112 days.

(21) Appl. No.: 13/670,410

(22) Filed: Nov. 6, 2012

(65) Prior Publication Data

US 2014/0129598 A1    May 8, 2014

(51) Int. Cl.
*G06F 17/30* (2006.01)

(52) U.S. Cl.
CPC ............... *G06F 17/30283* (2013.01)

USPC .......................................... 707/803

(58) Field of Classification Search
USPC .......................................... 707/803
See application file for complete search history.

*Primary Examiner* — Joshua Bullock
(74) *Attorney, Agent, or Firm* — Perkins Coie LLP

(57) ABSTRACT

Disclosed is a method and system for dynamically persisting log data from member computers in a network. The log data is transmitted as a plurality of shards to a router of router-writer pairs which transmits the shards to writers of the router-writer pairs that persist the shards into a storage unit. A shard contains a distinct subset of the log data. The shards are transmitted to the writers based on a writer assignment map that identifies a writer assigned to persist each of the shards. The assignment of the shards to a writer is performed based on assignment criteria that include at least one of (i) number of writers, (ii) a load of the writers, (iii) number of shards, (iv) size of a particular shard, or (v) estimated load capacity of writers.

23 Claims, 6 Drawing Sheets

DYNAMIC MANAGEMENT OF LOG PERSISTENCE

FIELD OF INVENTION

This invention generally relates to management of log data persistence in a distributed system. More specifically, the invention relates to persisting log data dynamically based on an overall status of the distributed system.

BACKGROUND

In computer related technologies, especially in distributed systems having a number of users performing a number of activities, large amount of data is created or modified. The data along with system level and user level actions may be stored in a storage system for monitoring, financial, and/or analysis purposes. However, if the storage system fails, the data may be lost which is not acceptable to the users of the distributed system. Accordingly, it is very important to record the details of the user actions in a log file and persist the log file in one or more storage systems. The log file may also be persisted separately from the actual data.

The prior log management systems that persist log files are not efficient at least in terms of scalability, load balancing, log persistence latency, consumption of computing resources, etc. in a high data throughput environment. In the prior log management systems, the distribution of load among writers assigned to persist the log files becomes complex and inefficient, especially as the number of computers in a computer network generating the log file increases. Further, in some systems, generated logs may be identified by a source specific category/group. This category is used to identify and fetch the corresponding logs from the storage system. The scaling complexity results from the need to process and persist these categories independently in the storage system. In some log management systems, an election per shard/category/group is performed among the writers to choose a particular writer for persisting a particular log file (category or group) into the storage system. As the number of generated log categories increases, the election process becomes more complex and resource intensive.

Further, in the prior log management systems that lack a central log management system, load distribution among various writers is not as effective since an overall load situation, that is, a load on each of the writers in relation to each other is not known. Further, since the state of distributed system keeps changing dynamically, the log management techniques need to adapt to the changed state of the distributed system quickly and efficiently.

SUMMARY

What is described is a method and system for dynamically persisting log data from member computers in a computer network. The log data can consist of plurality of groups or categories (henceforth, group or category may be referred to as "category"). The log data is transmitted as a plurality of shards to a router of router-writer pairs which transmits the shards to writers of the router-writer pairs that persist the shards into a storage unit. Each of the shards is a distinct subset of the log data and contains log data of the same category. The shards are transmitted to the writers based on a writer assignment map, created by a log persistence manager, which identifies a writer assigned to persist each of the shards. The assignment of the shards to a writer is performed based on assignment criteria that include at least one of (i) number of writers, (ii) existing load of the writers, (iii) number of shards, (iv) size of a particular shard, or (v) estimated load capacity of the writer.

In at least some embodiments, creating the writer assignment map includes monitoring the assignment criteria and reassigning the shards, assigned to a particular writer, to different writers of router-writer pairs if the assignment criteria changes.

In at least some embodiments, reassigning the shards, assigned to a particular writer, to different writers of router-writer pairs includes determining whether the particular writer is inactive. If the writer is inactive, the shards assigned to the particular writer are reassigned to other writers.

Some embodiments of the invention have other aspects, elements, features, and steps in addition to or in place of what is described above. These potential additions and replacements are described throughout the rest of the specification.

DETAILED DESCRIPTION

References in this description to "an embodiment", "one embodiment", or the like, mean that the particular feature, function, or characteristic being described is included in at least one embodiment of the present invention. Occurrences of such phrases in this specification do not necessarily all refer to the same embodiment, nor are they necessarily mutually exclusive.

Disclosed is a method and system for dynamically persisting log data from member computers in a computer network. The log data can consist of plurality of groups or categories (henceforth, group or category may be referred to as "category"). The log data is transmitted as a plurality of shards to a router of router-writer pairs which transmits the shards to writers of the router-writer pairs that persist the shards into a storage unit. A shard is a subset of the log data and contains log data of the same category. The shards are transmitted to the writers based on a writer assignment map that identifies a writer assigned to persist each of the shards. The assignment of the shards to a writer is performed based on assignment criteria that include at least one of (i) number of writers, (ii) a load of the writers, (iii) number of shards, (iv) size of a particular shard, or (v) estimated load capacity of the writer.

Environment

Figure 1:
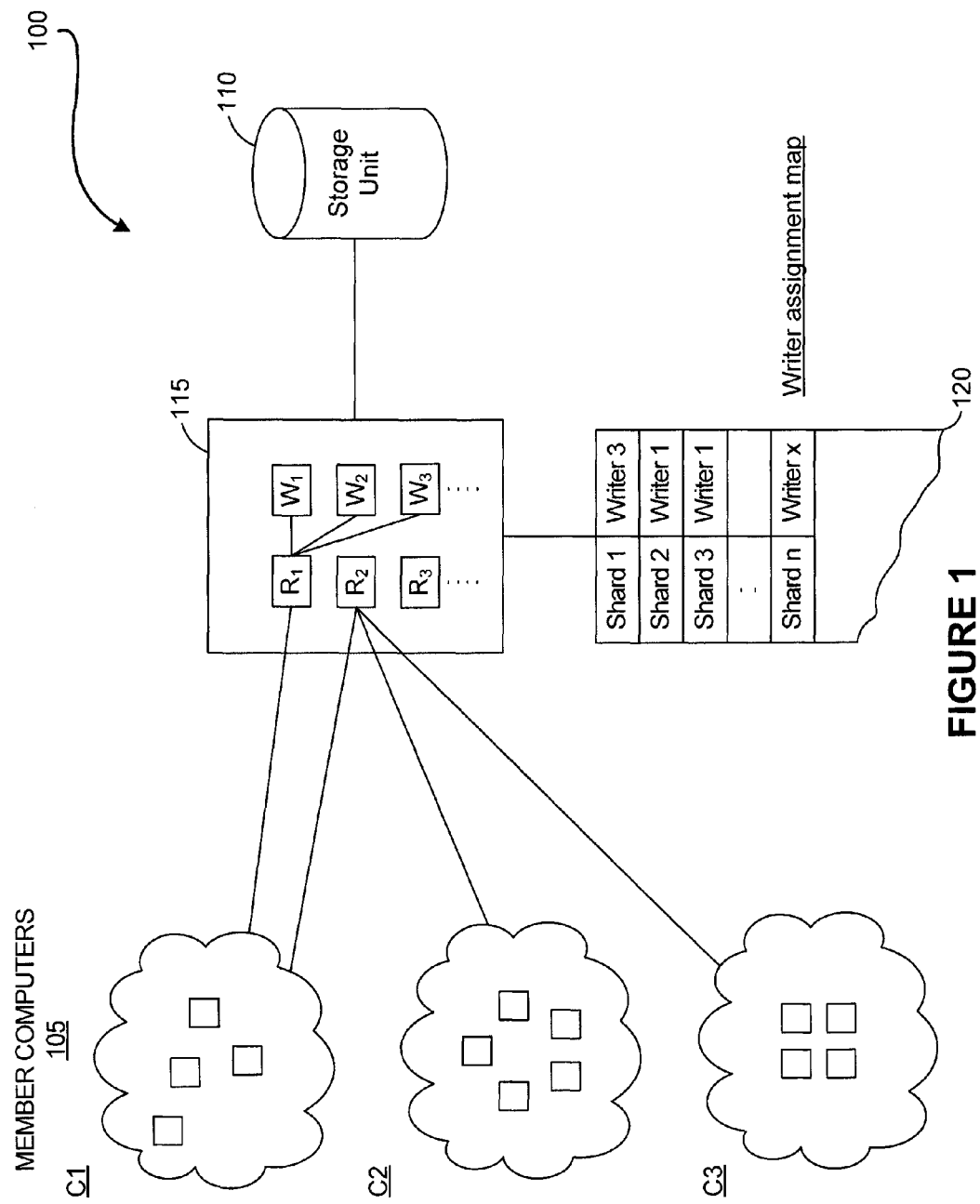
FIG. 1 is an environment in which an embodiment of the invention may operate.

FIG. 1 is an environment in which an embodiment of the invention may operate. The environment includes a system 100 for dynamically managing persistence of log data received from member computers 105. The log data is persisted into a storage unit 110, such as a database. The log data generated by the member computers 105 can be viewed as a plurality of shards, wherein each shard is a non-overlapping subset of the log data. The system 100 also includes a plurality of router-writer pairs 115 that receive the shards from the member computers 105 and persist the shards in the storage unit 110. Routers, namely, "R1," "R2," "R3," and so on of the router-writer pairs 115 receive the shards from the member computers 105 and routes them to writers of the router-writer pairs 115 which persist the shards in the storage unit 110.

Each of the writers, namely, "W1," "W2," "W3" and so on of the router-writer pairs persist a particular set of shards. The set of shards assigned to each of the writers are defined in a writer assignment map 120. The writer assignment map 120 includes the set of shards and the writers as key value pairs. In an embodiment, as shown in FIG. 1, the writer assignment map 120 includes shards as keys and the writers persisting those shards as values. For example, "Shard 1," is a key and a writer, "W3" assigned to the shard, "Shard 1" is the value. In another embodiment, the writer assignment map 120 may include writers as keys and the set of shards assigned to the writers as values. For example, the writer assignment map 120 may include a writer, "W1" as a key and all the shards, "Shard 2," Shard 3," and "Shard n" assigned to "W1" as values of the key "W1." In yet another embodiment, the writer assignment map 120 can be generated using other data structures.

A router of the router-writer pairs 115 receives the log data as shards from the member computers 105. The router routes or transmits the shards to the corresponding writers based on the writer assignment map 120.

The member computers 105 can be a cluster of computers, such as clusters "C1," "C2" and "C3." Each of the clusters generates log data. The computers in the clusters can be web servers or any other machines that generate log data. The log data can be any user or machine activity. For example, in a social networking context, such activities may include creating a news feed, subscribing to a news feed, updating a status message on a user's wall, uploading a picture, commenting, etc. These activities may be performed on end user computers (not shown) for which log data is generated by the member computers 105.

The member computers 105 may be in the same location or at different locations. Each of the clusters may generate any number of categories of log data with varying rates. For example, cluster C1 may generate log data for only news feed and cluster C2 may generate log data only for uploading pictures. In another example, both C1 and C2 may generate log data for news feed and uploading pictures. Further, each of the clusters may generate different amount of log data and at different rates. In an embodiment, if user activity in a particular category is more and/or occur at higher rates than in the other categories, that particular category's user data may be generated at higher rates and in larger amount. For example, in a social networking environment having millions of users, there could be billions of transactions that can generate a significantly large amount, for example, Gigabytes or Terabytes of log data per second from the member computers 105. To efficiently persist such huge amount of log data with minimal delays, the load on each of the writers has to be balanced. Accordingly, an embodiment of the disclosed technique creates the writer assignment map 120 based at least on the load of the writers.

A router-writer pair may run on the same machine or different machines. The clusters of the member computers 105 may transmit the shards to any of the routers in the router-writer pairs 115. In an embodiment, a cluster may transmit the shards to a router that may be located in or near the same cluster. In some embodiments, the clusters may also transmit the shards to a router in the neighboring cluster. Regardless of which router the shards are transmitted to, the router which receives the shards transmits the shards to the corresponding writers based on the writer assignment map. The writers persist the shards into the storage unit 110.

Figure 2:
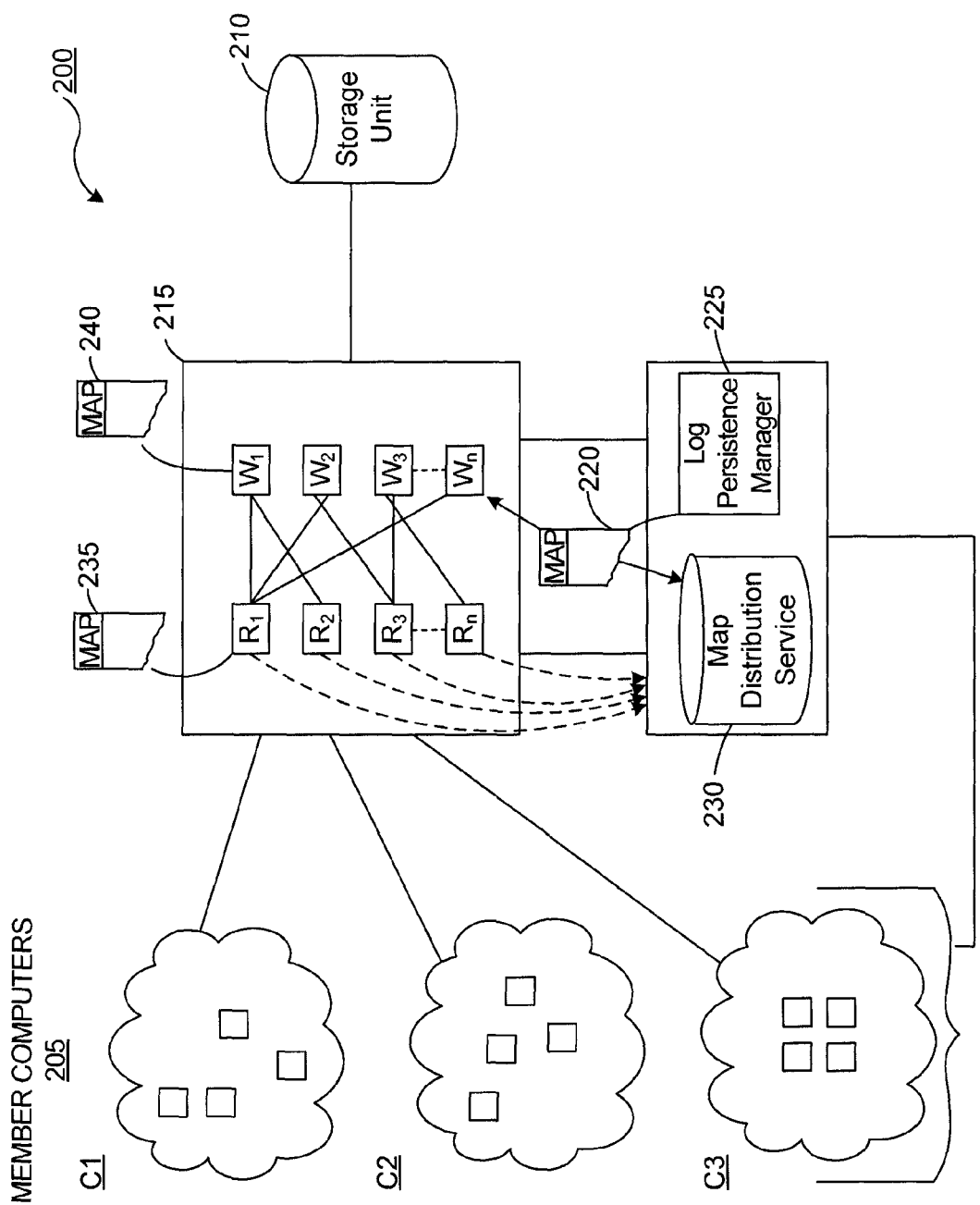
FIG. 2 is a block diagram of a system for dynamically managing the persistence of log data.

FIG. 2 is a block diagram of a system 200 for dynamically managing the persistence of log data, according to an embodiment of the disclosed technique. The system 200 may operate in an environment similar to system 100 of FIG. 1. The system 200 includes member computers 205 that generate log data, and a plurality of router-writer pairs 215. The plurality of router-writer pairs 215 receive log data from the member computers 205 as a plurality of shards. The router-writer pairs 215 persist the shards in a storage unit 210, such as a database. Each of the shards is a subset of the log data.

As explained above in association with FIG. 1, each of the shards from the member computers 205 is assigned to a particular writer of the router-writer pairs 215. The assignments of the shards to the writers are defined in a writer assignment map 220 created by a log persistence manager 225. The log persistence manager 225 publishes the writer assignment map 220 to a map distribution service 230. The log persistence manager 225 publishes the writer assignment map 220 to the writers as writer assignment map 240. The routers may obtain the writer assignment map 220 as writer assignment map 235 by querying the map distribution service 230. In another embodiment, the map distribution service 230 may publish the writer assignment map 220 as writer assignment map 235 to the routers.

When the shards are transmitted by the member computers 205 to a router, the router refers to the writer assignment map 235 to identify a writer assigned for each of the shards and transmits the shards to the corresponding writers. The writer, upon verifying, using the writer assignment map 240, that the received shard is assigned to the writer, persists the shard in the storage unit 210. If the received shard is not assigned to the writer, the writer may reject the shard.

The log persistence manager 225 assigns the shards to the writers based on predefined assignment criteria. The predefined assignment criteria include at least one of a number of writers, a load of the writers, a size of a particular shard, etc. in the system 200. The log persistence manager 225 has knowledge of the system 200 that may include a number of member computers 205, the number of shards from the member computers 205 that have to be persisted, a number of writers of the router-writer pairs 215 available, a load of each of the writers, etc. The log persistence manager 225 monitors the system 200 continuously and updates the assignments of the shards to the writers, if necessary, when the behavior of the system 200 changes.

The properties or behavior of the system 200 can change dynamically and/or continuously. For example, the amount of log data being generated by the member computers 205 may increase. In another example, if user activity in a particular category increases, a size of the shard containing the log data of the particular category may increase. In another example, one of the writers may become unavailable, or a load on a writer may have exceeded a predefined threshold, etc. In such cases, the log persistence manager 225 updates the assignments of shards to the writers dynamically and publishes the updated writer assignment map.

Following are some example scenarios and reassignments performed by the log persistence manager 225.

Scenario 1—A load on writer W1 exceeds the load of other writers by predefined threshold.

Potential Solution—Reassign some of the shards assigned to W1 to other writers

Scenario 2—A writer W1 is inactive
  Potential Solution—Reassign all the shards assigned to writer W1 to other writers and delete the writer W1 from the writer assignment map 220
Scenario 3—Size of a particular shard has increased beyond a predefined size
  Potential Solution 1—Reassign some or all of the other shards, except the particular shard, assigned to a writer to other writers
  Potential Solution 2—Split the particular shard into a number of new shards, wherein each of the new shards is a subset of the particular shard and reassign all the shards, including the new shards, to the writers Accordingly, the log persistence manager 225 continuously monitors the system 200 and updates the writer assignment map 220 as necessary. As and when the writer assignment map 220 is updated, the updated writer assignment map 220 may be made available to the writers, the map distribution service 230 and routers.

The system 200 is a distributed system, that is, the components of the system 200 may run on different machines located at different locations. For example, the log persistence manager 225, the map distribution service 230, the router-writer pairs 215, the storage unit 210 and the member computers 205 may all exist at or across different locations and may run on different and/or multiple machines. Therefore, when the writer assignment map 220 is published by the log persistence manager 225 to the writers, the map distribution service 230 and the routers, they all may not receive the writer assignment map 220 at the same time due to various reasons (such as network delay) which can occur in a distributed system.

Accordingly, the writer assignment maps (including the writer assignment map 220 at the map distribution service 230, the writer assignment map 235 at the routers and the writer assignment map 240 at the writers) may not be synchronized. It is possible for any of these entities to have an older version of the writer assignment map 220 while the log persistence manager 225 has already published an updated writer assignment map. In such scenarios, the shards may be rejected by the routers or the writers.

For example, if a router receives a shard and is not able to determine or identify the assigned writer from the writer assignment map 235, the shard may not be transmitted to the writers. Or in another case, if the router determines, from the writer assignment map 235, that a shard is assigned to writer W1 and transmits the shard to W1, but the writer W1 determines, from the writer assignment map 240 that the shard is not assigned to it, the shard may be rejected by the writer W1. Such scenarios may arise when the writer assignment maps at different entities are not synchronized yet. In such cases, a number of predefined actions may be performed. One of the predefined actions may include buffering the shard for a predefined time before re-examining the shard to the writer assignments map for its writer mapping. If, in the predefined time, the writer assignment maps at different entities have synchronized, the shards may be successfully transmitted to the appropriate writer and persisted in the storage unit 210.

The log persistence manager 225 is aware of the status of the writers in the router-writer pairs 215. Each of the writers transmits a heart beat signal to the log persistence manager 225 at predefined intervals. The heart beat signal indicates that the writer is active. The log persistence manager 225 determines that a particular writer is inactive if it does not receive a heart beat signal from the particular writer in a predefined interval. The inactive writers are deleted from the writer assignment map 220 and the shards assigned to them are reassigned to other writers and the writer assignment map 220 is updated accordingly. If the writer is still functioning (e.g. network partitioning), the writer will locally receive a signal that it has disconnected from the log persistence manager 225 and will begin rejecting shards. When the writer is back to an active status, the writer may be included in the writer assignment map 220. Similarly, when a new writer is included in the router-writer pairs 215, the log persistence manager 225 includes the new writer in the writer assignment map 220 and assigns the shards to the new writer.

The set of all potentially generated shards from each of the member computers 205 are registered with the log persistence manager 225. The set of shards may be updated dynamically. The knowledge of the set of shards, the available writers in the system 200, the load on the writers, allows the log persistence manager 225 to effectively and dynamically manage the persistence of shards into the storage unit 210.

Methods for Dynamically Managing Log Persistence

Figure 3:
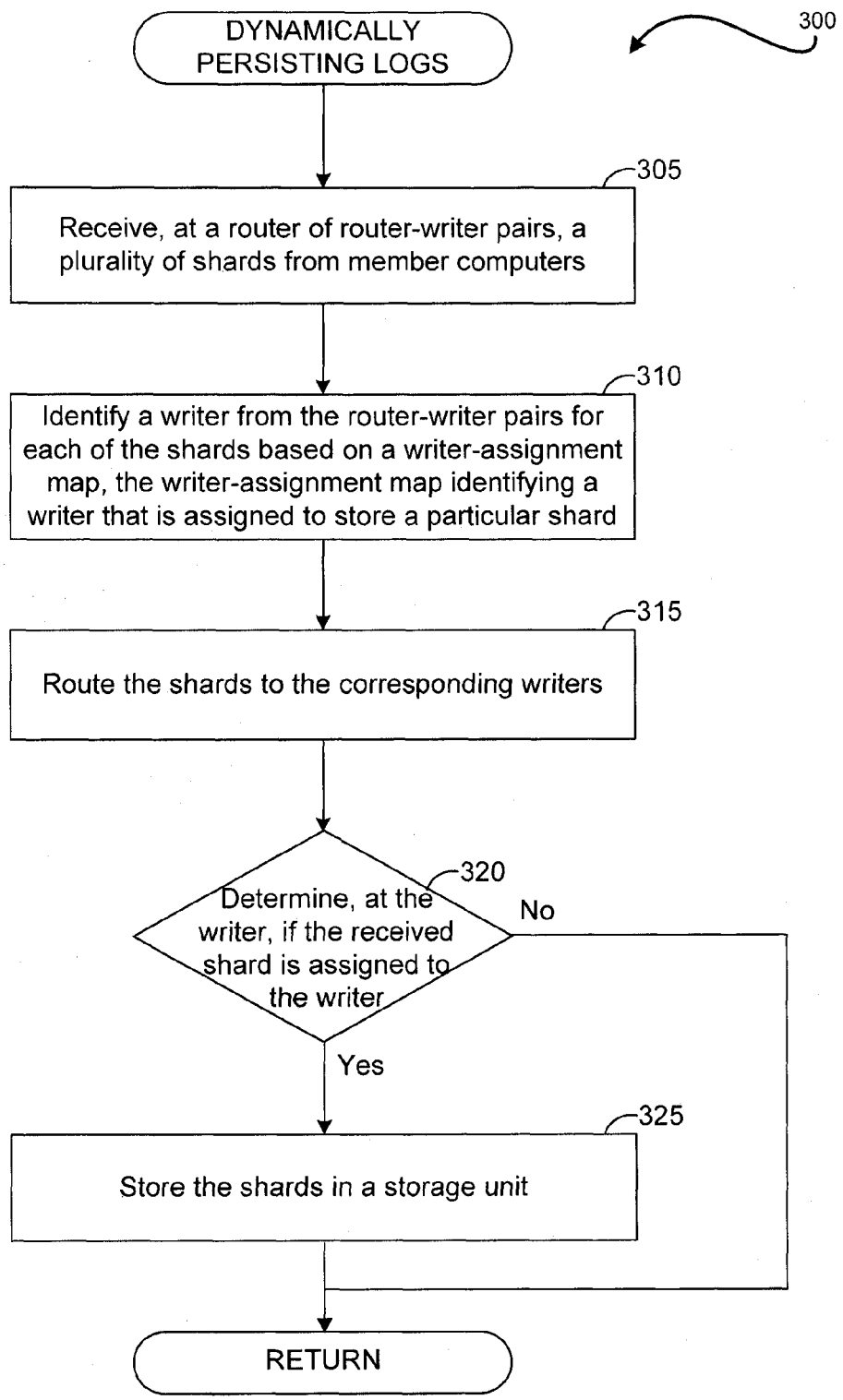
FIG. 3 is a flow diagram of a process for dynamically persisting log data into a storage unit.

FIG. 3 is a flow diagram illustrating a process 300 for dynamically persisting log data into a storage unit, according to an embodiment of the disclosed technique. The process 300 may be executed in a system such as system 200 of FIG. 2. At step 305, a router of a router-writer pairs receives a plurality of shards from member computers in a computer network. Each of the shards is a subset of the log data transmitted by the member computers. At step 310, the router identifies a writer of the router-writer pairs to which each of the shards are assigned based on a writer assignment map. The writer assignment map defines the assignments of the shards to the writers.

At step 315, the router transmits the shards to the corresponding writers. At determination step 320, a writer determines whether the received shard is assigned to the writer. The writer refers to its local writer assignment map to determine whether the shard is assigned to the writer. At step 325, responsive to a determination that the shard is assigned to the writer, the writer stores the shard in the storage unit. On the other hand, responsive to a determination that the shard is not assigned to the writer, the process returns.

Figure 4:
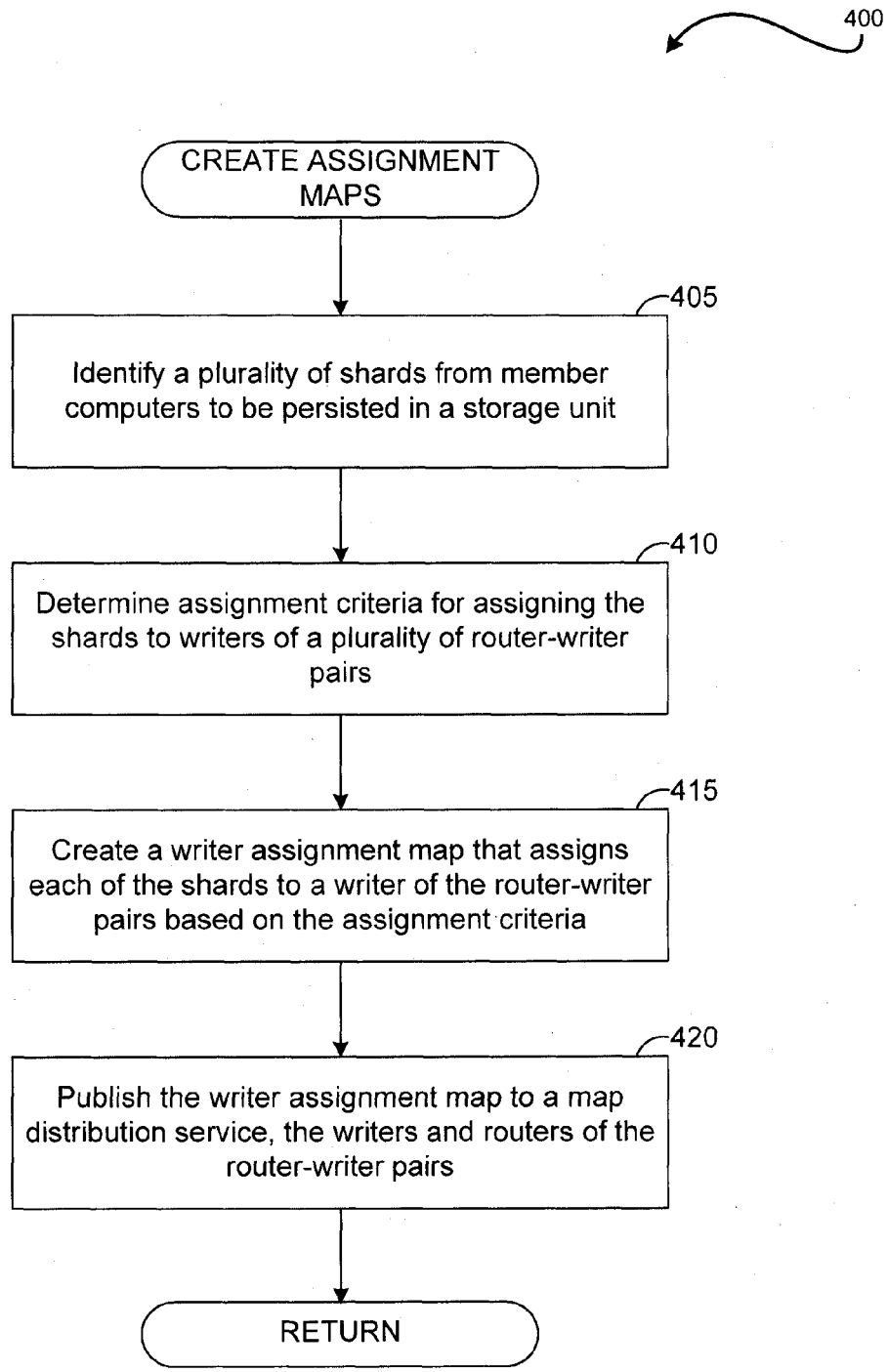
FIG. 4 is a flow diagram for creating a writer assignment map.

FIG. 4 is a flow diagram illustrating a process 400 for creating a writer assignment map, according to an embodiment of the disclosed technique. The process 400 may be executed in a system such as system 200 of FIG. 2. At step 405, a log persistence manager identifies a set of shards to be transmitted from member computers in a computer network. The set of shards represent the log data transmitted by the member computers and each of the shards is a subset of the log data. At step 410, the log persistence manager determines the assignment criteria for the shards. The assignment criteria includes at least one of (i) number of shards, (ii) size of a particular shard, (iii) number of writers that persist the shards into a storage unit, (iv) a load of the writers, or (v) estimated load capacity of each writer.

At step 415, the log persistence manager creates the writer assignment map based on the assignment criteria. At step 420, the log persistence manager publishes the writer assignment map to the writers and a map distribution service. Routers in the router-writer pairs that transmit the shards from the member computers to the corresponding writers can obtain the writer assignment map by querying the map distribution service. In another embodiment, the map distribution service may publish the writer assignment map to the routers.

Figure 5:
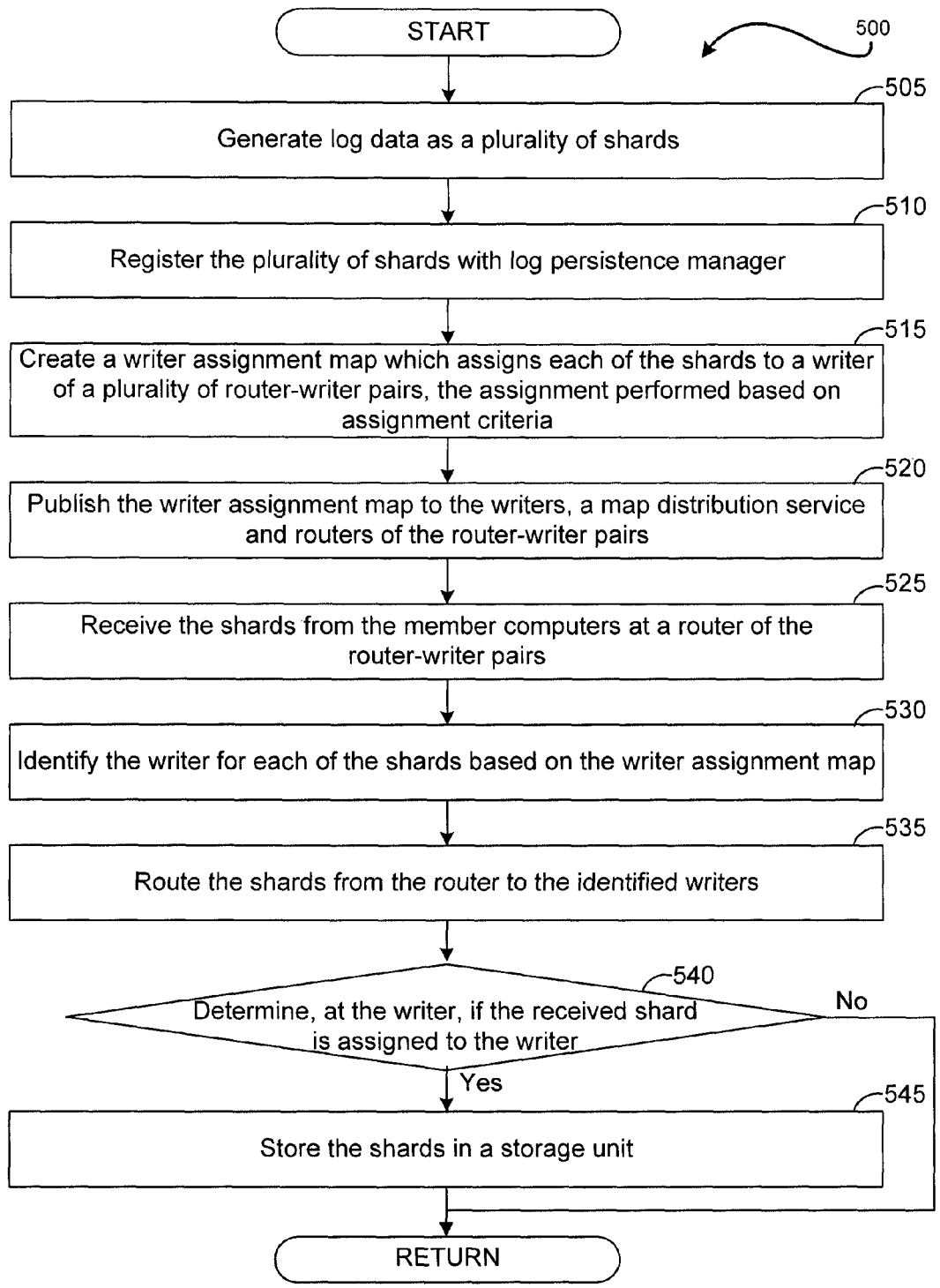
FIG. 5 is a flow diagram of another process for dynamically persisting log data.

FIG. 5 is a flow diagram illustrating a process 500 for dynamically persisting log data in to a storage unit, according to an embodiment of the disclosed technique. The process 500 may be executed in a system such as system 200 of FIG. 2. At step 505, log data is generated as a plurality of shards.

The log data may be generated by member computers in a computer network. At step 510, the plurality of shards are registered with the log persistence manager. Each of the shards is a distinct subset of the log data. In an embodiment, the member computers publish information regarding the shards to the log persistence manager.

At step 515, the log persistence manager creates a writer assignment map based on assignment criteria. The assignment criteria includes at least one of (i) number of shards, (ii) size of a particular shard, (iii) number of writers that persist the shards into a storage unit, (iv) a load of the writers, or (v) estimated load capacity of each writer. The writer assignment map assigns each of the shards to a writer of a router-writer pairs. At step 520, the log persistence manager publishes the writer assignment map to the writers and a map distribution service. Routers in the router-writer pairs that transmit the shards from the member computers to the corresponding writers can obtain the writer assignment map by querying the map distribution service.

At step 525, a router receives the shards from the member computers. At step 530, the router identifies the writer to which each of the shards are assigned based on the writer assignment map. At step 535, the router routes or transmits the shards to the corresponding writers. At determination step 540, a writer determines whether the received shard is assigned to the writer. The writer determines whether the received shard is assigned to the writer by referring to its writer assignment map. At step 545, responsive to a determination that the shard is assigned to the writer, the writer stores the shard in the storage unit. On the other hand, responsive to a determination that the shard is not assigned to the writer, the process returns.

Apparatus

Figure 6:
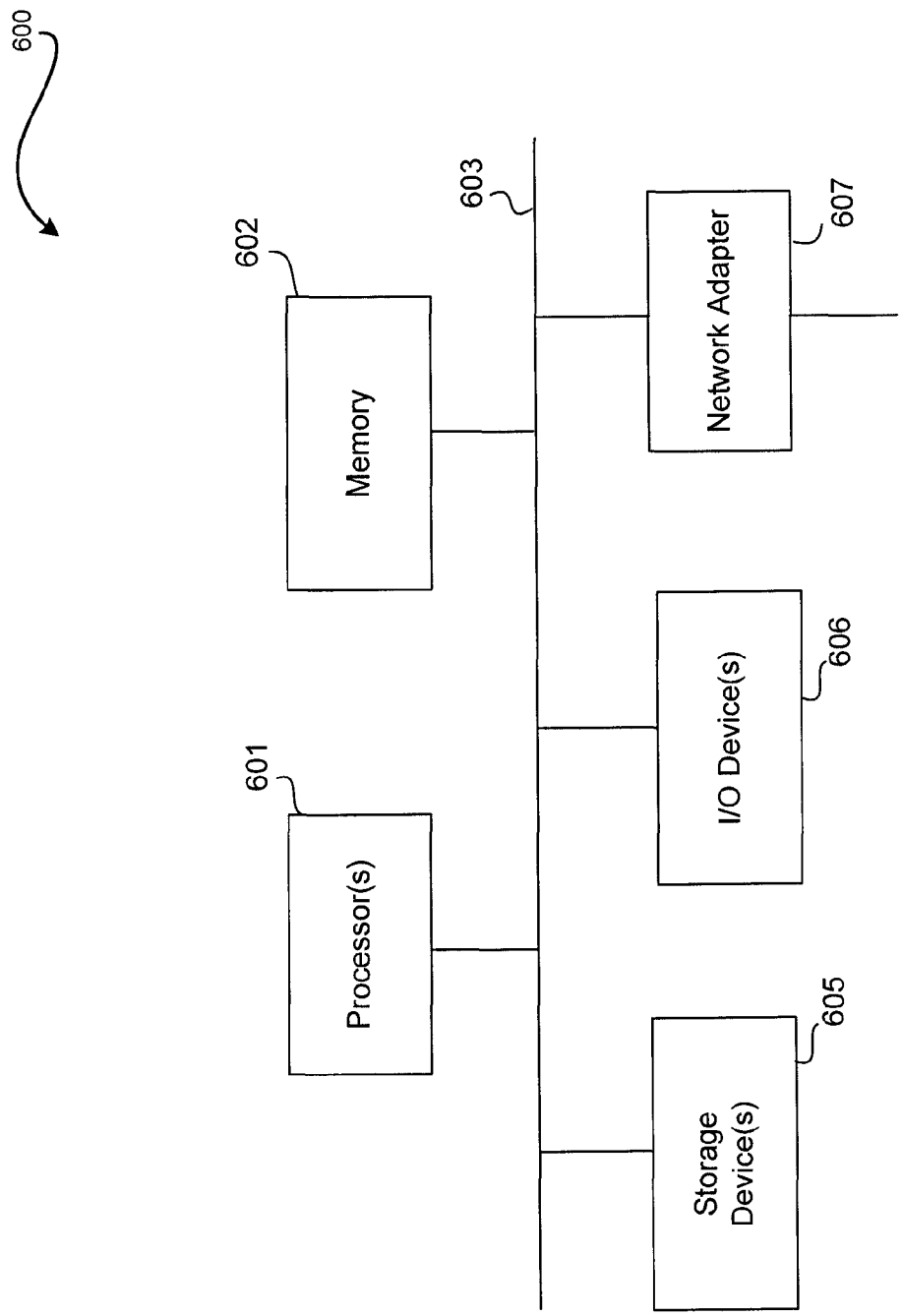
FIG. 6 is a block diagram of an apparatus that may perform various operations, and store various information generated and/or used by such operations.

FIG. 6 is a block diagram of an apparatus that may perform various operations, and store various information generated and/or used by such operations, according to an embodiment of the disclosed technique. The apparatus can represent any computer described herein. The computer 600 is intended to illustrate a hardware device on which any of the entities, components or services depicted in the examples of FIGS. 1-5 (and any other components described in this specification) can be implemented, such as a, a server, client, storage devices, databases, routers, writers, log persistence manager, map distribution service, etc. The computer 600 includes one or more processors 601 and memory 602 coupled to an interconnect 603. The interconnect 603 is shown in FIG. 6 as an abstraction that represents any one or more separate physical buses, point to point connections, or both connected by appropriate bridges, adapters, or controllers. The interconnect 603, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 601 is/are the central processing unit (CPU) of the computer 600 and, thus, control the overall operation of the computer 600. In certain embodiments, the processor(s) 601 accomplish this by executing software or firmware stored in memory 602. The processor(s) 601 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 602 is or includes the main memory of the computer 600. The memory 602 represents any form of random access memory (RAM), read-only memory (ROM), flash memory, or the like, or a combination of such devices. In use, the memory 602 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 601 through the interconnect 603 are a network adapter 607, a storage device(s) 605 and I/O device(s) 606. The network adapter 607 provides the computer 600 with the ability to communicate with remote devices, over a network and may be, for example, an Ethernet adapter or Fibre Channel adapter. The network adapter 607 may also provide the computer 600 with the ability to communicate with other computers within the cluster. In some embodiments, the computer 600 may use more than one network adapter to deal with the communications within and outside of the cluster separately.

The I/O device(s) 606 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory 602 can be implemented as software and/or firmware to program the processor(s) 601 to carry out actions described above. In certain embodiments, such software or firmware may be initially provided to the computer 600 by downloading it from a remote system through the computer 600 (e.g., via network adapter 607).

The techniques introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

A machine-accessible storage medium or a storage device(s) 605 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, can include, for example, programmable circuitry programmed with specific software and/or firmware, special-purpose hardwired circuitry, or a combination thereof.

What is claimed is:

1. A method for persisting log data by a plurality of router-writer pairs in a computer network, the method comprising:
    creating, by a log persistence manager in the computer network, a writer assignment map that assigns each of a plurality of shards to a writer of the router-writer pairs, wherein each of the shards is a subset of the log data, the assignment identifying the writer assigned to persist a particular shard into a storage unit, and the assignment performed based on assignment criteria;
    receiving, at a router of the router-writer pairs, the shards from member computers in the computer network; and
    routing, by the router, the shards to corresponding writers of the router-writer pairs based on the writer assignment map.

2. The method of claim 1 further comprising:
    storing the shards by the corresponding writers in the storage unit.

3. The method of claim 1, wherein the assignment criteria includes at least one of (i) number of writers, (ii) a load of the writers, (iii) number of shards, or (iv) size of a particular shard.

4. The method of claim 1, wherein creating the writer assignment map includes:
    registering, by the member computers, the plurality of shards with the log persistence manager.

5. The method of claim 1 further comprising:
    publishing, by the log persistence manager, the writer assignment map to each of the writers to create a first writer assignment map.

6. The method of claim 5 further comprising:
    publishing, by the log persistence manager, the writer assignment map to a directory service in the computer network to create a second writer assignment map.

7. The method of claim 6 further comprising:
    publishing, by the directory service, the writer assignment map to each of the routers to create a third writer assignment map.

8. The method of claim 7, wherein the first writer assignment map of the writers, the second writer assignment map of the directory service, and the third writer assignment map of the routers are in a synchronized state.

9. The method of claim 8, wherein the first writer assignment map of the writers, the second writer assignment map of the directory service, and the third writer assignment map of the routers are not in a synchronized state.

10. The method of claim 6, wherein routing the shards to the corresponding writers includes:
    querying, by the router, the directory service to identify a writer assigned to persist a particular shard.

11. The method of claim 1, wherein each of the writers transmits, to the log persistence manager, a heartbeat signal which indicates an active status of that writer.

12. The method of claim 11, wherein the heartbeat signal is transmitted to the log persistence manager at predefined intervals.

13. The method of claim 1, further comprising:
    monitoring, by the log persistence manager, the assignment criteria; and
    reassigning the shards, assigned to a particular writer, to different writers of router-writer pairs if the assignment criteria changes.

14. The method of claim 13, wherein reassigning the shards to different writers includes:
    determining, by the log persistence manager, whether the particular writer is inactive,
    responsive to a determination that the particular writer is inactive, deleting the particular writer from the writer assignment map, and
    reassigning the shards, assigned to the particular writer, to other writers of router-writer pairs.

15. The method of claim 14, wherein determining whether the particular writer is inactive includes:
    determining that the particular writer is inactive if the log persistence manager did not receive a heartbeat signal from the particular writer at predefined intervals.

16. The method of claim 15, wherein reassigning the shards to different writers includes:
    determining whether a shard of the shards received from a member computer is larger than a predefined shard size,
    responsive to a determination that the shard is larger than the predefined shard size, splitting, by the log persistence manager, the shard into a plurality of new shards,
    assigning, by the log persistence manager, the shards and the new shards to the writers, based on the load of the writers, to create an updated writer assignment map, and
    publishing the updated writer assignment map to the directory service and the writers.

17. The method of claim 16 further comprising:
    routing, by the router, the shards including the new shards to the corresponding writers based on the updated writer assignment map.

18. The method of claim 1 further comprising:
    rejecting, by a particular writer of the writers, a shard of the shards transmitted by the router to the particular writer.

19. The method of claim 18 further comprising:
    performing, by the router, a predefined action when the shard is rejected by the particular writer.

20. The method of claim 19, wherein the predefined action includes retransmitting the shard to the particular writer after a predefined time interval.

21. The method of claim 19, wherein the predefined action includes:
    querying, by the router, a directory service that has the writer assignment map to determine if the shard is reassigned to a different writer, and
    responsive to a determination that the shard is reassigned to a different writer, retransmitting, by the router, the shard to the different writer.

22. A method for persisting log data in a computer network by a plurality of router-writer pairs, the method comprising:
    identifying, by a log persistence manager in the computer network, a plurality of shards containing the log data generated by member computers in a computer network, each of the shards being a subset of the log data;
    assigning, by the log persistence manager, each of the shards to a writer of the router-writer pairs to create a writer assignment map, wherein writers of the router-writer pairs persist the assigned shards into a storage unit, and wherein the assignment of shards to the writers is based on assignment criteria;
    publishing, by the log persistence manager, the writer assignment map to a directory service in the computer network;
    receiving, at a router of the router-writer pairs, the shards from the member computers in the network;

routing, by the router, the shards to corresponding writers, the corresponding writers determined based on the writer assignment map from the directory service; and storing the shards by the corresponding writers in the storage unit.

23. A system for persisting log data generated by member computers in a computer network, the system having a plurality of computing devices having processors, comprising:

a plurality of router-writer pairs in the computer network, wherein a router of the router-writer pairs receives a plurality of shards from member computers in the computer network, and wherein each of the shards is a subset of the log data; and a log persistence manager configured to create a writer assignment map, the writer assignment map including an assignment of each of the shards to a writer of the router-writer pairs, the assignment identifying the writer assigned to persist a particular shard, the writer assignment map created based on assignment criteria, wherein the router transmits the shards to corresponding writers of the router-writer pairs based on the writer assignment map, and wherein the writers store the assigned shards in a storage unit.

* * * * *